United States Patent [19]
Charles et al.

[11] 3,814,163
[45] June 4, 1974

[54] ADJUSTABLE BEAD SEATER

[75] Inventors: Malcolm Jean Charles; Donald G. Runge, both of Lodi, Calif.

[73] Assignee: B & J Manufacturing Company, Glenwood, Ill.

[22] Filed: Oct. 18, 1972

[21] Appl. No.: 298,657

[52] U.S. Cl. ............................................. 157/1.1
[51] Int. Cl. ............................................. B60c 25/12
[58] Field of Search .................................. 157/1.1

[56] References Cited
UNITED STATES PATENTS
3,552,469   1/1971   Corless ............................. 157/1.1
3,675,705   7/1972   Corless ............................. 157/1.1
3,683,991   8/1972   Ruhland et al. ................... 157/1.1

Primary Examiner—Othell M. Simpson
Assistant Examiner—Harold P. Smith, Jr.
Attorney, Agent, or Firm—Whittemore, Hulbert & Belknap

[57] ABSTRACT

Apparatus for seating the beads and inflating tubeless tires on a vehicle wheel is provided. The apparatus for seating the tire beads comprises a pair of oppositely disposed tubular segments having orifice means for injecting air under pressure through the space between the wheel rim and the tire bead. The segments are interconnected by telescoping tubular structure to permit adjustment of the apparatus for use on tires of different sizes.

5 Claims, 4 Drawing Figures

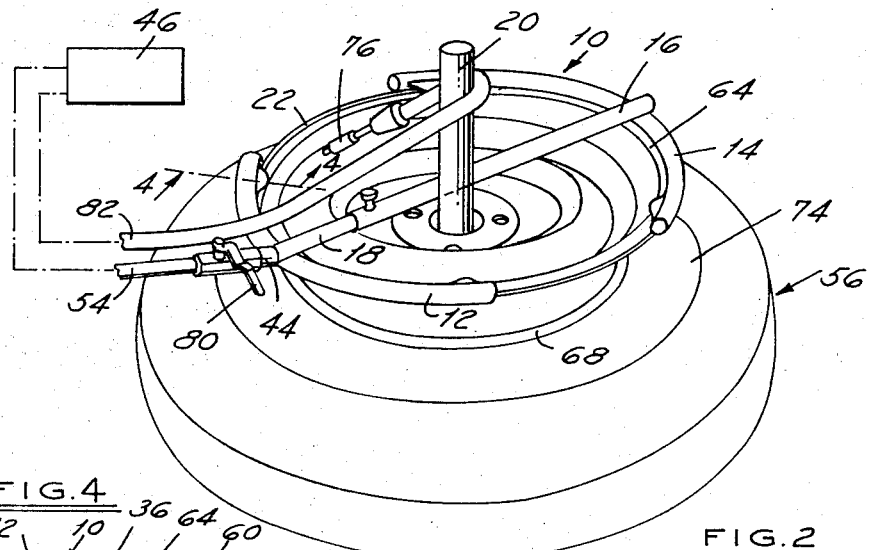
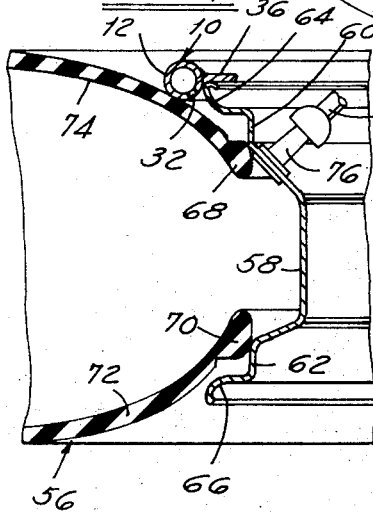
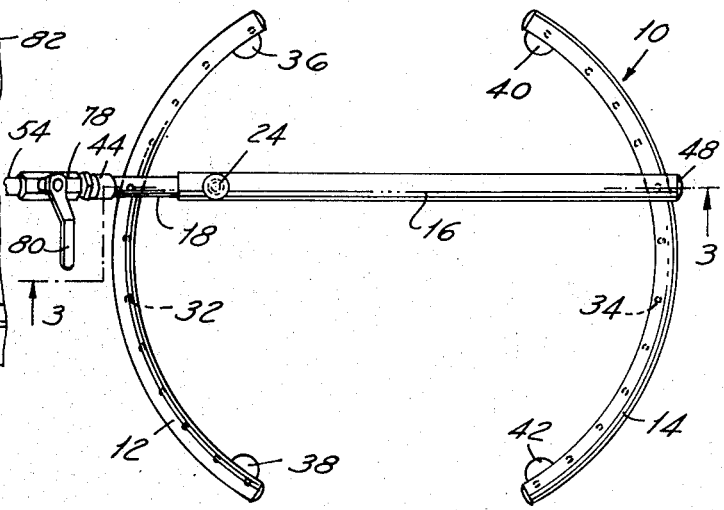
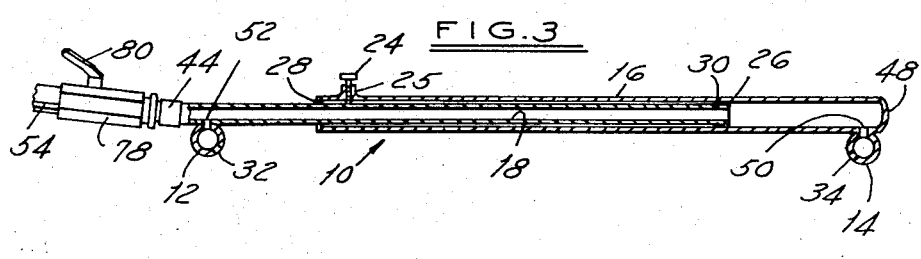

ADJUSTABLE BEAD SEATER

BACKGROUND OF THE INVENTION

Inflation of tubeless tires on vehicles has proved to be a problem. When a tubeless tire is mounted on a wheel, the sidewalls do not normally form sealing engagement with the rim of the wheel. Various mechanical techniques have been utilized in the past to bulge the sidewalls of the tire out and cause engagement of the tire beads with the wheel rim whereupon the tire may be inflated through the conventional tire valve. Such techniques have proved to be awkward and time consuming and have not been readily adaptable to some types of tires, such as radial ply and glass belted tires.

Apparatus for inflating tubeless tires which utilizes only a simple annular tubular member having orifices spaced around the periphery thereof through which air is injected into a tire through the gap between the tire bead and wheel rim is disclosed in U.S. Pat. Nos. 3,522,469 and 3,675,705. These devices do not employ any working parts which must slide or otherwise fit exactly on the tire or wheel. There is essentially no wear of the parts and the problem of accurate dimensions is considerably reduced. One problem encountered with the apparatus disclosed in said patents is that differently sized tubular members must be provided for the various tire sizes such as truck tires versus passenger tires. The present invention provides an apparatus which is adjustable so that one apparatus is usable on many different tire sizes.

SUMMARY OF THE INVENTION

Apparatus is provided for inflating tubeless tires on a vehicle wheel rim having oppositely disposed rim portions. The apparatus comprises tire bead seating apparatus which includes a pair of oppositely disposed tubular segments. Adjustable structure interconnects the segments. The adjustable structure is adjustable to move the tubular segments closer together or farther apart. Means are provided for supplying air under pressure to the tubular segments. The apparatus is adjustable for placement around wheel rims of different sizes upon which a tubeless tire is mounted for injecting air under pressure through the space between the wheel rim and the bead of a non-inflated tubeless tire mounted on the wheel rim in sufficient amounts, without using a mechanical seal, so that more air will be injected into the tire than may escape with the result that the tire will be expanded to cause the tire beads to sufficiently close on the wheel rim to permit complete inflation through the conventional tire valve.

IN THE DRAWING

FIG. 1 is a view in perspective of one embodiment of the tire bead seater in accordance with the present invention illustratively being utilized to inflate a tire;

FIG. 2 is a top plan view of the tire bead seater of FIG. 1;

FIG. 3 is a sectional view of the tire bead seater taken substantially along the line 3—3 of FIG. 2 looking in the direction of the arrows; and FIG. 4 is a sectional view of a portion of the tire bead seater and wheel assembly taken substantially along the line 4—4 of FIG. 1 looking in the direction of the arrows.

Referring to the FIGS., the tire bead seater 10 comprises a pair of oppositely disposed arcuate tubular segments 12, 14 which are joined together by means of an adjustable telescoping tubular structure consisting of an outer tubular element 16 and an inner tubular element 18 received therewithin. As will be noted in FIG. 2, the arcuate segments 12, 14 have their concave portions facing each other. The tubular structure connecting the segments 12, 14 together does not extend across the centers of the segments 12, 14 but rather is offset from the centers thereof. In this fashion, the tubular structure is so positioned as to miss the center post 20 present on most tire mounting machines, the post 20 being designed to receive the wheel rim 22 of a wheel assembly.

A thumb screw 24 is threadingly received in an internally threaded opening provided in a boss 25 adjacent to one end of the outer tubular element 16. The inner end of the thumb screw 24 engages the outer surface of the tubular element 18 and frictionally engages this element to maintain the tubular elements in any given adjusted position. The tubular elements may be telescoped into or out of each other merely by loosening the thumb screw 24 and then retightening it when the desired adjusted position has been obtained. Thus the tire bead seater 10 is capable of being extended or retracted for use on wheel rims of different dimensions. For example, in one actual embodiment of the invention, the tire bead seater is capable of assuming a minimum diameter of 12½ inches and a maximum diameter of 19¾ inches.

As will be noted in FIG. 3, the inner tubular element 18 is of slightly smaller diameter than the outer tubular element 16 thereupon leaving clearance between the two elements. The inner end of tubular element 18 has a radially outwardly extending lip 26 formed thereon. The outer end of tubular element 16 has a radially inwardly extending lip 28 formed thereon. The lips 26, 28 function as guide elements during telescoping of the tubular structure. Additionally, the lip 28 in the fully extended position of the tubular elements acts as a stop to prevent separation thereof. An O-ring 30 is provided adjacent the inner end of tubular element 18 to engage the inner surface of tubular element 16 and form an air seal.

A plurality of orifices 32, 34 are provided in spaced apart relationship around the interior periphery of the tubular segments 12, 14. The orifices may be provided at, for example, 1½ inch centers and may be one-eighth inch in diameter. Other spacing and diameters are, of course, permissible depending upon the application, size of segments and the like. Instead of a circular opening as shown, a continuous or interrupted slit may be used to form the orifice means. Nozzles also may be utilized as orifice means.

Radially inwardly directed tabs 36, 38, 40, 42 are provided at each end of each segment 12, 14 above the orifices 32, 34 as will be noted in FIG. 2, it being understood that FIG. 2 represents the underside of the tire bead seater 10. The tabs function to prevent insertion of the tire bead seater 10 entirely over the wheel rim 22 so that the tire bead seater 10 will lay directly on the wheel rim 22 as shown in FIG. 1 with the segments 12, 14 extending slightly beyond the wheel rim. The tubular structure 11 provides a convenient handhold to hold the bead seater down in a desired fixed position during the seating process.

An injection nozzle 44 including a valve structure 78 is provided on one end of the tubular element 18 for injecting air from a source 46 (FIG. 1) of air under pressure into the bead seater so that air will be expelled therefrom through the orifices 32, 34 as individual air jets. Instead of using the tubular elements 16, 18 to supply air to the segments 12, 14, separate air hoses may be employed. Further, other adjusting structure may be used to interconnect the segments 12, 14. The end 48 of tubular element 16 is closed. As will be noted in FIG. 3, openings 50, 52 are provided for gas communication between tubular elements 16, 18 and tubular segments 12, 14. The nozzle 44 may be a 1 inch nozzle for the reception of an air hose 54 for supplying a sufficient volume of air for inflating a tire, whether the tire be a large truck tire or smaller passenger tire. The nozzle 44 may, of course, be larger or smaller depending upon the type tires which are to be inflated.

In accordance with the method of the invention, the tire bead seater 10 is utilized as illustrated in FIGS. 1 and 4. A tubeless tire 56 is first mounted on wheel rim 22 by means of a conventional tire mounting apparatus. It will be noted that the wheel rim comprises a central cylindrical well 58, outwardly extending annular flange portions 60, 62 which terminate in annular flange-like rims 64, 66. The flanges 60, 62 serve as the sealing surfaces for the tire beads 68, 70 and also, in conjunction with the rims, as positioning and retaining structure for the tire.

Prior to inflation, it will be appreciated that the lower bead 70 of the tire sidewall 72 rests on the radially inward portion of the lower flange 62 thus partially seating the bead. The upper sidewall 74, as is the usual condition when attempting to inflate tubeless tires (FIG. 1), is collapsed downwardly with the bead 68 out of engagement with the upper rim flange 64. There is therefore a relatively wide space between the bead 68 and the rim flange 64. It is consequently impossible to inflate the tire by means of the usual tire valve 76 because air which is injected through the valve 76 will escape to the atmosphere via the space between the wheel rim and tire bead without inflating the tire.

After the tire 56 has been mounted on the wheel rim 22, the tire bead seater 10 is placed over the wheel rim 22. It will be noted that the orifices extend beyond the wheel rim and are aimed at the space between the wheel rim and tire bead. When air pressure is applied to the interior of the bead seater, discrete jets of air will be injected into the tire in the area of the segments 12, 14. It is possible for some air to escape from the spaces between the segments. However, more air is injected into the tire than may escape with the result that the tire will inflate. The valve structure 78 is provided for turning the supply of air on and off. A lever 80 is provided for manipulation of the valve.

The tire bead seater 10 is maintained in place during seating of the tire beads by the operator grasping the tubular structure 16 with one hand and the air hose structure which is attached to the nozzle 44 with the other hand. This prevents the bead seater from rising as a result of back air pressure during seating of the tire beads.

A second air hose 82 is secured to the conventional valve 76. The air hose 82 is used to completely inflate the tire after the beads have been seated.

The air hoses 54, 82 are connected to the air source 46 which may be an air tank which provides a relatively large volume of air under the desired pressure, as for example, in the range of 160 to 175 psi. Thus, a surge of air under pressure is available to cause inflation of the tire. The air tank may be filled by the use of the usual air compressor available in tire mounting service stations. Frequently, the line losses from the usual air compressor available at these stations are sufficient to prevent bead seating of a tire when the air supply lines are connected directly without provision of an intermediate surge tank located near the bead seater.

When the valve 78 is open, air under pressure is injected into the tire interior via the orifices 32, 34. The sidewall 74 begins to rise as a result of the increased air pressure within the tire. While some high pressure air may escape to the atmosphere, there is sufficient air under pressure forced into the tire to cause partial inflation of the tire. The sidewall 74 will rise until a point of equilibrium, as shown in FIG. 4, is reached wherein the bead 68 contacts the wheel rim but does not necessarily have sealing engagement therewith. At this time, any space between the tire bead and wheel rim is relatively small and forms an air flow restriction. Air is continued to be supplied to the tire via the valve 76. This causes complete inflation of the tire after initial bead seating with the tire beads sealingly engaging the wheel rim in the usual manner. The amount of air under pressure injected into the tire may be checked in the usual manner by means of a manual air gauge and the exact desired tire inflation pressure may be obtained.

What I claim as my invention is:

1. Apparatus for inflating tubeless tires on a vehicle wheel rim having oppositely disposed rim portions comprising tire bead seating apparatus including a pair of oppositely disposed tubular segments, said tubular segments having orifice means for injecting air under pressure to the space between a wheel rim and the bead of a non-inflated tubeless tire mounted on the wheel, adjustable structure interconnecting said segments, said adjustable structure comprising a pair of telescoping tubular elements, means to selectively lock said tubular elements in adjusted position, each of said tubular elements being connected to one of the tubular segments, opening means between each of said tubular elements and associated tubular segments for passage of air under pressure from the tubular elements to the tubular segments, means to supply air under pressure to the tubular elements thereby defining means for supplying air under pressure to the tubular segments said apparatus being adjustable for placement around wheel rims of different sizes upon which a tubeless tire is mounted for injecting air under pressure through the space between the wheel rim and the bead of a non-inflated tubeless tire mounted on the wheel rim in sufficient amounts without using a mechanical seal, so that more air will be injected into the tire than may escape with the result that the tire will be expanded to cause the tire beads to sufficently close on the wheel rim to permit complete inflation through the conventional tire valve.

2. Apparatus as defined in claim 1, further characterized in the provision of structure extending radially inwardly from said segments for abutment against a wheel rim to position the apparatus with respect to the wheel rim.

3. Apparatus as defined in claim 1, further characterized in that said inlet means includes an air valve, and manual means for opening and closing said air valve.

4. Apparatus as defined in claim 1, further characterized in that said orifice means comprises a plurality of spaced apart openings on the inner periphery of the tubular segments for emitting jets of air under pressure in the direction of the space between the wheel rim and the tire beads.

5. Apparatus as defined in claim 1, further characterized in that the interconnecting adjustable structure is offset from the center of the tubular segments so as to permit use of the apparatus on a conventional tire mounting machine which has an upstanding center post.

* * * * *